N. CROSSLEY.
COMBINED EYE SHADE AND SHIELD.
APPLICATION FILED DEC. 31, 1917.
1,313,469.
Patented Aug. 19, 1919.
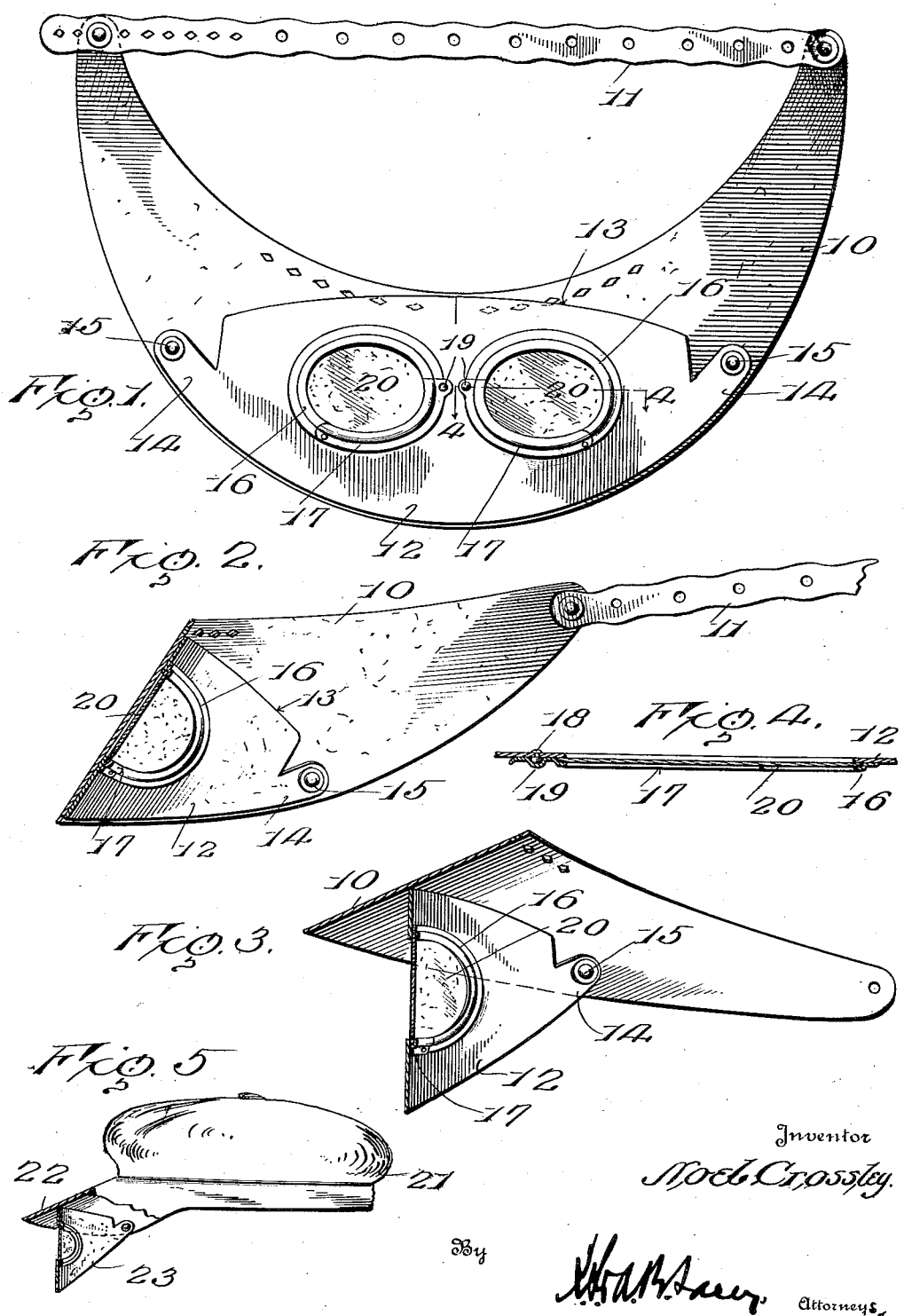
Inventor
Noel Crossley.

UNITED STATES PATENT OFFICE.

NOEL CROSSLEY, OF TORONTO, ONTARIO, CANADA, ASSIGNOR OF TEN PER CENT. TO MARY J. HUNT, OF BRACEBRIDGE, ONTARIO, CANADA.

COMBINED EYE SHADE AND SHIELD.

1,313,469. Specification of Letters Patent. Patented Aug. 19, 1919.

Application filed December 31, 1917. Serial No. 209,687.

*To all whom it may concern:*

Be it known that I, NOEL CROSSLEY, a citizen of the United States, residing at Toronto, Province of Ontario, Dominion of Canada, have invented certain new and useful Improvements in Combined Eye Shades and Shields, of which the following is a specification.

This invention relates to a combined eye shade and shield and has as its primary object to provide a device of this character especially designed to be worn by mechanics or other similar artisans, by sportsmen, or by automobilists, for shading the eyes from excessive light as well as protecting the eyes against flying objects, dust or dirt.

The invention has as a further object to provide an arrangement wherein the shield employed will normally be held in inactive position beneath the eye shade or visor of the device and wherein the said shield may, when desired, be swung to project downwardly from the said shade in front of the eyes of the wearer.

A further object of the invention in this connection is to provide an arrangement wherein the resiliency of the eye shade will serve to yieldably hold the shield in active position.

And the invention has as a still further object to provide an arrangement wherein sight opening will be formed in the shield and surrounded by lens frames or rims so constructed that light filtering lenses of different density may be readily substituted one for the other within the said frames for protecting the eyes of the wearer or wherein, if desired, plain glass lenses ground to suit the eyes of the wearer may be arranged for assisting the vision of the wearer.

Other and incidental objects will appear as the description proceeds, and in the drawings wherein I have illustrated the preferred embodiment of the invention, and wherein similar reference characters designate corresponding parts throughout the several views:

Figure 1 is a plan view showing the inner side of the shade and shield and particularly illustrating the mounting of the said shield, Fig. 2 is a sectional view particularly illustrating the disposition of the shield when in normal position beneath the shade, Fig. 3 is a similar view showing the shield swung to active position, Fig. 4 is a sectional view taken on the line 4—4 of Fig. 1 looking in the direction of the arrows, this view particularly showing the construction of the lens frames of the shield, and Fig. 5 is a side elevation partly broken away and showing a slight modification of the invention as embodied in a cap.

In carrying out the invention, I employ an eye shade or visor 10 preferably of crescent shape. Extending between the ends of the shade and swingingly connected therewith is an adjustable strap or other suitable flexible element 11, for securing the shade upon the head of the wearer in the manner well understood. For ordinary purposes the shade 10 is preferably formed of celluloid or other resilient transparent material but in any instance where the device is intended for use by persons so occupied that the shade, if constructed of such material would likely catch fire, the said shade may be formed of a non-combustible substance.

Mounted to coöperate with the shade 10 is a shield 12, arranged medially of the shade and, as shown in Fig. 2, normally lying in inactive position therebeneath. This shield is tapered toward its ends and is formed with a convex outer edge conforming to the convexity of the outer edge of the shade 10, while the inner edge 13 of the said shield is also convex so that the major width of the shield is substantially equal to that of the shade. Formed on the extremities of the shield, at its outer edge, are reduced arcuate tabs 14 through which are fitted suitable removable fastening devices 15, swingingly connecting the shield with the shade. The shield will thus connect the opposite end portions of the shade for maintaining the said shade bowed to fit around the head of the wearer. Furthermore, it will be seen upon an inspection of Fig. 2, that, owing to the stiffness of the material of the shield the extremities of the shade must be bowed toward each other in order to permit downward swinging movement of the shield. Thus the shield will normally be yieldably held by the shade in inactive position disposed within the lines of the shade, lying flat therebeneath. The shield is preferably formed of celluloid or other resilient translucent material but in any instance where the device would be used in a situation wherein the shield might catch fire, the said shield would, of course, be constructed of non-combustible material.

Formed through the shield are spaced sight openings surrounded by flanged lens frames or rims 16. Each of these frames is formed with a swinging section 17 normally held to close the frame by a button or knob 18 engaging in a suitable socket 19 in the free end of the frame section. Removably fitted within the said frames and held against displacement therefrom by the frame sections 17, are lenses 20.

As will now be readily understood, the shield 12 may be disposed in inactive position, as shown in Fig. 2 of the drawings, and the shade worn in the usual manner for shading the eyes against excessive light. However, should it be desired to shield the eyes against flying objects or protect the eyes from dust or dirt, the shield may be swung to active position, as shown in Fig. 3 of the drawings, disposed in a substantially vertical position in front of the eyes. In order to thus swing the shield to active position the said shield is grasped by its free edge when the inner edge of the said shield is pushed forwardly and outwardly to pivot the tabs 14 upon the fastening devices 15 and move the inner edge of the shield beneath the shade until the shield has reached its vertical position. In this connection it will be noted that when the shield is thus swung upon the fastening devices 15, the sides of the shade will be swung inwardly toward each other against the resiliency of the shade. Consequently, the transverse bowing of the shade will be materially increased so that the said shade will frictionally bind against the upper edge of the shield for yieldably holding the said shield in vertical active position and since the shield is formed with a convex inner edge, the shade will be flexed to fit around this edge to engage therewith throughout its entire length and provide a tight joint between the shield and the shade.

The shield when disposed in active position will thus be held to efficiently protect the eyes and support the lenses 20 immediately in front of the eyes. Consequently, when the device is intended for use by sportsmen or automobilists, the lenses 20 may be formed of colored glass for filtering the light and protecting the eyes from any glare. Since the lenses 20 may be readily removed, it will be noted that the user may substitute various pairs of lenses of different density and thus select a pair of lenses found best suited to the surrounding conditions at the time of use of the device. In any instance where the device is to be used by a mechanic or other similar artisan to protect the eyes against flying particles of sparks, plain glass lenses may be employed. In every instance, should the vision of the wearer of the device be defective, ground lenses to suit the eyes may be mounted upon the shield to consequently eliminate the necessity for wearing spectacles or nose glasses.

It will, therefore, be seen that I have provided a particularly simple and efficient construction for the purpose set forth and a device which, since it combines an eye shade and an eye shield, is adapted for a very wide range of use. Furthermore, the device may be inexpensively manufactured and thus delivered to the user at nominal cost.

In Fig. 5 of the drawings I have illustrated a slight modification of the invention wherein the shield is applied directly to the visor of a cap. In this figure a cap is conventionally illustrated at 21. This cap is provided with a visor 22 and swingingly mounted beneath the visor is the shield 23. This shield is identical with the shield previously described and is mounted in a similar manner. Accordingly it is believed that, in view of the previous description, it is unnecessary to describe the details of this modified structure since it is thought that the manner in which the shield is manipulated upon the cap visor will be readily understood. This modified construction provides a very simple arrangement whereby a workman's cap or the cap of a sportsman or automobilist may be readily equipped with the shield of the present invention. Since the visor 22 of the cap will serve in the capacity of an eye shade the term eye shade as herein used shall accordingly be held to include a cap visor or a like element of other similar head coverings.

Having thus described the invention, what is claimed as new is:

1. A device of the character described including an eye shade, and a shield swingingly mounted beneath the shade and normally lying against the inner side face thereof, the said shield being formed with a convex inner edge and being movable to project downwardly in active position from the shade holding the shade bowed to fit the inner edge of the shield and provide a close joint therebetween.

2. The combination with an eye shade, of a shield connected with the shade and movable to project downwardly therefrom in active position frictionally coacting with the shade for holding the shield in such position.

3. A device of the character described including an eye shade, and a shield connected at its ends with the shade and movable to active position projecting downwardly from the shade frictionally coacting at its upper edge with the shade for holding the shield in such position.

4. A device of the character described including an eye shade, a shield, tabs projecting from the ends of the shield, and means engaging said tabs and connecting the shield with the shade for movement to active position projecting downwardly from the shade frictionally coacting therewith for holding the shield in such position.

5. A device of the character described including a shade, and a shield normally carried inactive upon the shade and movable to active position binding against the shade to be held in such position thereby.

6. A device of the character described including a shade, and a shield connected at its end portions to the end portions of the shade and having its intermediate portion free, the shield being movable beneath the shade to active position for drawing in the end portions of the shade and bowing the shade into position coacting with the shield for holding the shield active.

7. A device of the character described including a shade, and a shield mounted therebeneath and movable to active position bowing the shade and extending in substantially vertical position between the end portions of the shade coacting therewith to be held by the shade in such position.

8. A device of the character described including a shade, and a shield swingingly connected at its extremities to the shade and having its pivot points fixed thereon, the intermediate portion of the shield being movable across the shade to dispose the shield in active position binding beneath the shade to be held thereby in such position.

In testimony whereof I affix my signature.

NOEL CROSSLEY. [L. S.]